(12) United States Patent
Frisch et al.

(10) Patent No.: US 6,581,638 B2
(45) Date of Patent: Jun. 24, 2003

(54) PIEZO VALVE

(75) Inventors: Herbert Frisch, Göppingen (DE); Hannes Wirtl, Schongau (DE); Michael Weinmann, Plüderhausen (DE); Martin Maichl, Salach (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/989,485

(22) Filed: Nov. 20, 2001

(65) Prior Publication Data

US 2002/0059957 A1 May 23, 2002

(30) Foreign Application Priority Data

Nov. 20, 2000 (EP) .............................................. 00125187

(51) Int. Cl.[7] .......................... F15B 13/044; F16K 31/02
(52) U.S. Cl. .............................. 137/596.17; 251/129.06
(58) Field of Search .................. 137/596.17; 251/129.06

(56) References Cited

U.S. PATENT DOCUMENTS

| | | | |
|---|---|---|---|
| 4,340,083 A | | 7/1982 | Cummins |
| 4,450,375 A | | 5/1984 | Siegal |
| 4,492,360 A | | 1/1985 | Lee, II et al. |
| 4,617,952 A | * | 10/1986 | Fujiwara et al. ....... 137/596.17 |
| 4,903,732 A | * | 2/1990 | Allen ..................... 251/129.06 |
| 5,343,894 A | | 9/1994 | Frisch et al. |
| 5,570,716 A | | 11/1996 | Kamen et al. |
| 6,024,340 A | | 2/2000 | Lazarus et al. |

FOREIGN PATENT DOCUMENTS

WO    WO 98/25061    6/1998

* cited by examiner

*Primary Examiner*—Gerald A. Michalsky
(74) *Attorney, Agent, or Firm*—Hoffmann & Baron, LLP (57) ABSTRACT

A piezo valve having a flexural transducer unit which includes two flexural transducers adapted to be deflected in opposite directions. The flexural transducers are fixedly joined together at one terminal part of the flexural transducer unit with the formation of a common bearing section. The flexural transducer unit is pivotally mounted in relation to the housing. At least one flexural transducer serves for the control of a valve opening associated with it, the other flexural transducer being able to be biased by the application of a drive voltage toward a support face arranged in a deflection path in order to for instance to increase the displacement path of the other flexural transducer.

24 Claims, 5 Drawing Sheets

PIEZO VALVE

BACKGROUND OF THE INVENTION

The invention relates to a piezo valve which has a plurality of piezoelectric flexural transducers and is adapted for the control of fluid flows.

THE PRIOR ART

In the case of a piezo valve disclosed in the patent publication WO 98/25061 two piezoelectric flexural transducers are connected together by means of a flexible contacting strand having electrical conductors and are arranged separately from one another in a valve housing. In accordance with the desired valve function the flexural transducer may be electrically driven in order to cause a deflection movement, which may be applied for opening or closing the valve openings to be controlled.

As in the case of piezo valves comprising only a single flexural transducer with the design in accordance with the said patent publication WO 98/25061 there is the problem that the displacements obtainable by the deflection of the flexural transducers, and accordingly the maximum cross section which may be made available for flow, of a valve opening is relatively small in the case of conventional drive voltages.

SHORT SUMMARY OF THE INVENTION

One object of the invention is to create a piezo valve in the case of which using one piezo transducer larger displacement movements may be ensured.

In order to achieve these and/or other objects appearing from the present specification, claims and drawings, in the present invention a piezo valve comprises a flexural transducer unit arranged in a valve housing, and which has at least two flexural transducers able to be driven by the application of drive voltages to produce opposite deflection movements, such two flexural transducers being arranged alongside each other with mutually parallel planes of deflection, and being fixedly joined together in a terminal region of the flexural transducer unit with the formation of a common bearing section, at which the flexural transducer unit is pivotally mounted for pivoting around a axis of rotation extending athwart the deflection planes in relation to the valve housing, at least one of such flexural transducers being designed in the form of a control flexural transducer serving for the control of at least one valve opening associated with it, while the other flexural transducers constitutes a support flexural transducer suitable for increasing the displacement and/or the force of the control flexural transducer, and which may be biased against a support face arranged in its displacement path by the application of the drive voltage. In the case of such a design the application of a drive voltage to the flexural transducer unit in a known manner can cause the deflection of the control flexural transducer, this giving rise to a certain displacement movement of such control flexural transducer. By now additionally activating the support flexural transducer, which bears in an opposite direction of deflection on the support face arranged in its displacement path, there will be a pivoting of the remaining flexural transducer unit around the axis of rotation, this leading to an additional displacement of the control flexural transducer in the desired direction of deflection and accordingly an increase in the displacement path which may be produced with it. Additionally or as an alternative the behavior described may also be employed to increase the force, with which the control flexural transducer is held in a given position.

Using only a single control flexural transducer and a single support flexural transducer it is possible to provide a simple shut off valve function, this creating the possibility of producing a 2/2 way valve in conjunction with a further valve opening.

However, the flexural transducers of the flexural transducer unit may if needed be respectively adapted to implement a multiple function so that each flexural transducer represents a control flexural transducer which simultaneously functions as a support flexural transducer for the respectively other control flexural transducer. Accordingly, while sticking the above mentioned advantages as regards increasing the displacement and/or closing force of functionally higher order higher piezo valves may be designed, as for instance 3/2 way and 3/4 way valves, which also have a middle position, in the case of which each flexural transducer closes its associated valve opening. Such piezo valves are important for applications, in which it is a question of shutting down on or trapping a predetermined fluid volume.

A further advantage of the rotary bearing of the flexural transducer unit is that in the case of thermal deformation there is an automatic correction of position or angular setting takes place without influencing stress relationships and so that irrespectively of thermal effects operational properties will always be the same.

Finally the design in accordance with the invention also facilitates the production of the piezo valve, because it is possible to dispense with a clamping in position of the flexural transducer, which only has to be mounted so that it may be pivoted.

Further advantageous developments of the invention are defined in the claims.

If it is a question of producing a reciprocal functionality so that each flexural transducer constitutes both a control flexural transducer and also a support flexural transducer, it is a particular advantage for the support face ensuring the support function to be formed directly by the valve seat of the respectively associated valve opening. It accordingly is possible to do without a separate support face, its function being performed by the valve seat. It is furthermore an advantage if in the case of the presence of two valve openings to be served such valve openings are provided on one and the same side of the flexural transducer unit. This means that production is simplified, because all valve openings to be served and any associated valve seats may be produced in a common part of the valve housing so that manufacturing inaccuracies may be minimized.

Spring means may be present to bias at least one controlled flexural transducer toward the closed position closing the valve opening served and hold same closed when in the electrically deactivated state. By way of the connection, which is torsionally stiff, at the bearing section it is simultaneously accordingly possible to ensure that furthermore the other flexural transducer is biased into a closed position to the extent that it is also designed as a control flexural transducer.

It is convenient for the flexural transducer elements to be so electrically connected together that by joint control thereof a simultaneous deflection in the same direction is caused. It would however also be possible to provide for individual control thereof so that for example the desired effect increasing the displacement and/or force is only used when necessary or a variable switching action takes place, in order to have variable increases in the displacement as for example for continuous applications. In a particularly advantageous design in accordance with the invention of the pivotal bearing the flexural transducer unit has one side of the bearing section placed on an engagement part on the housing and it is biased here by at least one loading element, which acts from the opposite side, against the engagement part. The flexural transducer unit is in this case held at the pivotal bearing point so that it is axially fixed in order to ensure the desired rotary entraining effect. The wording at least one loading element means more particularly a spring element. Given a suitable design of the flexural transducer unit the supply of the drive voltage necessary for operation may be directly by way of the at least one loading element and/or by way of the engagement part so that no additional electrical contact means are necessary.

It is more particularly taking into account the respective operational requirements that it is possible to depart from the equal distance normally present between the valve openings to be served and the axis of rotation and to have different distances here. Furthermore, in the case of there being several valve openings to be served, the valve seat associated with them may be at least approximately in a common plane or at different levels.

The stiff connection between the two flexural transducers at the common bearing section could in principle be produced by any suitable attachment means, which ensure such a stiff connection that between the two flexural transducer transmission of torque is ensured, which leads to the desired entraining effect, in the direction of rotation defined by the axis of rotation. However, as a particularly preferred design it is possible to provide the one or more flexural transducers respectively with at least one piezo body having one or more piezo material layers, such piezo bodies having an associated electrode arrangement, the bodies being integrally connected together at the bearing section with the piezo material layers of their piezo bodies. This integral design is more particularly advantageous from the manufacturing point of view, it being possible to imagine the flexural transducer unit being like a plate or board slotted along part of its length.

Further advantageous developments and convenient forms of the invention will be understood from the following detailed descriptive disclosure of one embodiment thereof in conjunction with the accompanying drawings.

DETAILED ACCOUNT OF WORKING EMBODIMENT OF THE INVENTION

The piezo valve 1 indicate in the drawings possesses an elongated valve housing 2, which delimits a valve chamber 3.

Preferably, the valve housing has two-part design with a bottom part 4 and a top part 5 secured to it. In the working embodiment illustrated the bottom part 4 has floor 6 with side walls 7 extending marginally from it upward, on which the top part 5 is secured like a cover.

Figure 8:
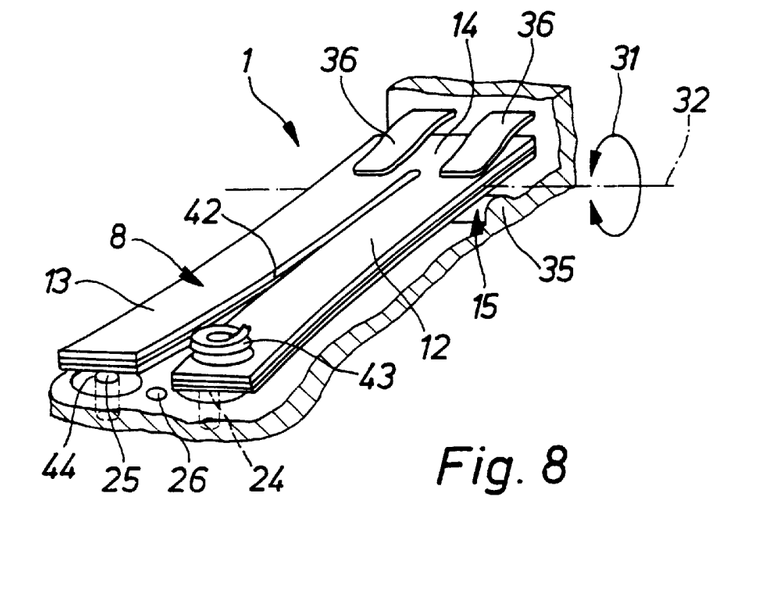
FIG. 8 shows the piezo valve in a perspective representation, the valve housing being only partly indicated.
Figure 9:
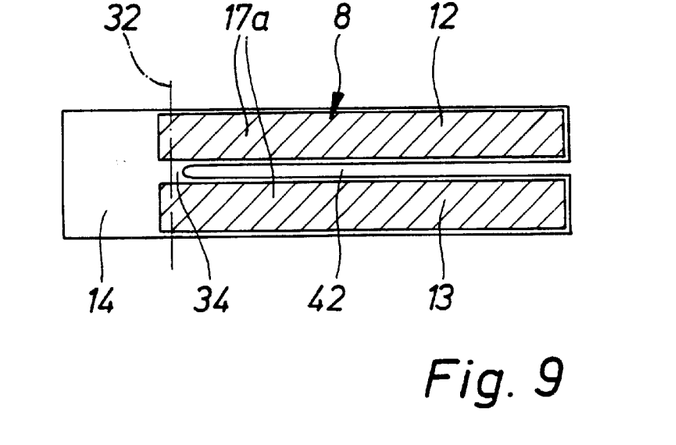
FIG. 9 illustrates the flexural transducer unit in a separate view from above looking toward one of the flat sides.

In the valve chamber there is an elongated flexural transducer unit 8, which is depicted in FIG. 8 in perspective and in FIG. 9 in plan view. The flexural transducer unit 8 has a plate-like, flat shape and contains two elongated piezoelectric flexural transducers 12 and 13 which are connected together permanently at the rear terminal part of the flexural transducer unit 8 by way of a bearing section 14. The two flexural transducers 12 and 13 are accordingly collected together as a self-supporting structure in the form of the flexural transducer unit 8. The flexural transducer unit 8 is secured in the valve housing 2 by means of the bearing section 14. The bearing point on the housing is indicated at 15.

Figure 1:
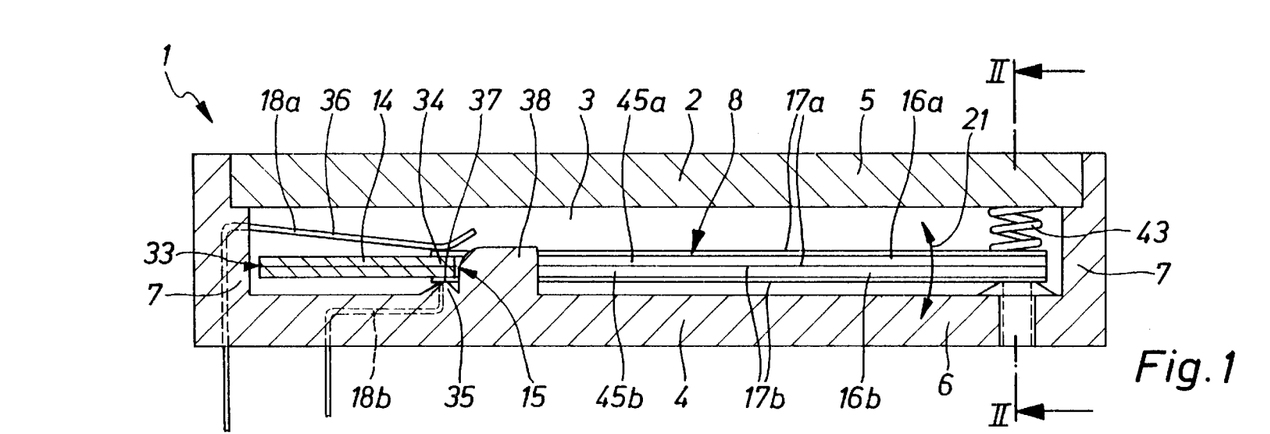
FIG. 1 represents a longitudinal section taken through a first design of the piezo valve of the invention on the section line I—I of FIG. 2 conceived as a 3/3 way piezo valve.

The flexural transducers 12 and 13 in the working example each have a bimorphic structure with two piezo bodies 16a and 16b, which are attached to one another on their long sides by bonding for instance. Each piezo body 16a and 16b possesses one or more piezo material layers 45a and 45b and an electrode arrangement 17a and 17b, which in a known manner extends between the individual piezo material layers or, respectively, the piezo bodies, which are joined together. In the plan view in accordance with FIG. 9 the two outermost electrode layers of the electrode arrangement 17a of the first piezo body 16a, which is on top in FIG. 1, of the two flexural transducers 12 and 13 are emphasized by shading. On the bottom side of the flexural transducers 12 and 13 there is a similar electrode structure.

By way of electrical contacting means 18a and 18b it is possible for a drive voltage to be applied from the outside to the electrode arrangements 17a and 17b. This causes a deflection of the respective flexural transducer 12 and 13 in a deflection plane 22 and 23, which extends perpendicularly to the principal plane of extent of the non-excited flexural transducer unit 8. The deflection movement is a flexural movement and is indicated by double arrow 21. It results from a shortening and possibly also stretching of the piezo material owing to the electric field applied by way of the electrode arrangement.

The flexural transducers 12 and 13 are so designed in the working embodiment that starting in the home position, in which same extend in the principal plane of extent of the flexural transducer unit 8, same may be selectively deflected to one or the other side of such plane.

In principle the flexural transducers 12 and 13 could also have a different structure and for instance be designed as a unimorphic or trimorphic flexural piezo transducer. Within the flexural transducer unit 8 the two flexural transducers 12 and 13 are arranged with a small distance between them alongside each other, their deflection planes 22 and 23 extending in parallelism to each other. The electrode arrangements 17a and 17b are preferably so connected together electrically that the flexural transducers 12 and 13 are caused to perform opposite deflection movements on the application of a drive voltage. The direction of such deflection movements depends on the polarity of the applied drive voltage. The electrical connections ensuring operation may be integrated in the piezo valve 1, for example by suitable electrical connection of the electrical contact means 18a and 18b and/or of the electrode arrangements 17a and 17b, although it may also be provided externally.

The piezo valve of the working example is designed in the form of 3/3 way valve. It possesses two controlled valve openings 24 and 25 of which the first one (24) is associated with the first flexural transducer 12 and the second (25) one is associated with the second flexural transducer 13. In accordance with the positioning of a respective flexural transducer 12 and 13 the valve opening 24 and 25, associated with it, may be closed or opened. The two controlled valve openings 24 and 25 are located in the valve chamber 3 on the inner face, delimiting same, of the valve housing 2. Here there is furthermore a third valve opening, which is not served or controlled and which irrespectively of the condition of activation of the flexural transducer unit 8 is at all times in communication with the valve chamber 3.

Each valve opening 24, 25 and 26 is connected with a valve duct 27 through the wall of the valve housing 2, such duct 27 leading to the outside. The valve duct 27 associated with the first valve opening 24 is a supply duct 27a connected during operation with a pressure source, the pressure medium being more particularly a gaseous pressure medium and more precisely compressed air. However, a hydraulic medium could also be utilized.

The valve duct 27 connected with the controlled second valve opening 25 is a venting duct 27b and for instance leads to the atmosphere. The still further valve duct 27, which is connected with the non-controlled third valve opening 26, represents a power duct 27c with which a load to be actuated, for example a fluid power load, may be connected.

By suitable electrical operation and accordingly deflection or non-deflection it is possible for the two flexural transducers 12 and 13 to be caused to assume particular positions. In the working embodiment illustrated such positions include the shut off position illustrated in FIGS. 2 and 5, the supply position depicted in FIGS. 2 and 5 and the venting position appearing in FIGS. 4 and 7.

In the shut off position the two controlled valve openings 24 and 25 are sealed off by the associated flexural transducers 12 and 13 so that the pressure medium contained in the valve chamber 3 and in the power duct 27c leading to the load, is trapped.

In the supply position the first valve opening 24 associated with the supply duct 27a is opened, whereas simultaneously the controlled second valve opening 25 is closed which is connected with the venting opening 27b. This ensures that the working duct 27c is supplied with pressure medium via the supply duct 27a from the valve chamber 3.

In the venting position, which is the reverse of the supply position, the supply duct 27a is shut off and the venting duct 27b is opened so that the load connected by way of the power duct 27c is vented through the valve chamber 3 to the venting duct 27b.

The functions described may be produced as switching functions, although it is also possible to get the same effect by having continuous control with variable preset sizes of the flow cross sections at the controlled valve openings 24 and 25.

The piezo valve 1 in the example could also be operated as a 3/4 way valve, a fourth switching position being made available by the simultaneous opening of both controlled valve openings 24 and 25.

In principle it would be possible to place the controlled valve openings 24 and 25 clear of the deflection path and more particularly alongside or terminally adjacent to the associated flexural transducer 12 and 13 so that the control of the degree of opening would be by the edge face of the respective flexural transducer 12 and 13. As a rule however the structure indicated in the drawings will be preferred, in the case of which the controlled valve openings 24 and 25 are placed directly in the deflection path of the associated flexural transducer 12 and 13 and are delimited by a preferably slightly protruding valve seat 28, whereon the respective flexural transducer 12 and 13 rests in the closed position and from which it is moved a greater or less extent in accordance with the flow cross section to be made available. It is therefore a question of a sort of seat valve.

Since the two flexural transducers 12 and 13 serve the controlled valve openings 24 and 25 to control fluid flows, same may be referred to a control flexural transducers. The controlled valve openings 24 and 25 are located on the same side of the flexural transducer unit 8 and in the working example are underneath its principal plane of extent. In conjunction with the multi-part housing design this does offer the manufacturing advantage that the corresponding means may be provided in one mold half.

A further substantial feature of the piezo valve 1 is that the flexural transducer unit 8 is not fixedly secured to the bearing section, as is normally the case with piezo valves. Instead of this at the bearing point 15 the bearing section 14 is pivotally borne (double arrow 31) at an axis or rotation 32 for pivoting in relation to the valve housing 2, such axis being set athwart and more particularly at a right angle to the deflection planes 22 and 23. Because the axis 32 of rotation is preferably set at an axial distance from the rear terminal face 33 of the flexural transducer unit and more particularly is located directly adjacent to the front side (which faces the flexural transducers 12 and 13) of the bearing section 14, the flexural transducer unit 8 is analogous to a rotatably mounted two-armed lever, which may rock like a see-saw, the bearing section 14 in FIG. 1 then moving downward, when the two flexural transducers 12 and 13 are simultaneously shifted upward and vice versa.

The axis 32 of rotation could directly be defined by shaft, for instance in the form of a pin projecting to either side of the two longitudinal edges of the flexural transducer unit 8, such pins being pivotally supported in the housing 2 of the valve while being free to turn.

A way of defining the axis 32 of rotation which is also particularly advantageous as regards manufacturing technology is adopted in the working example. Here the flexural transducer unit 8 is borne at one of the two flat sides at the bearing section 14, which is preferably rectangular or square in cross section, on an engagement part 35 (which is on the housing) and is biased resiliently toward the engagement part 35 by two loading elements 36, which act from the opposite side on the bearing section 14. The engagement part 35 is in the working embodiment constituted by a projection, extending into the valve chamber 3, on the wall of the valve housing 2 and defines a support edge 37 extending perpendicularly to the deflection planes 22 and 23, on which edge the bearing section 14 rests. In this case the bearing section 14 has recess, not illustrated in detail, into which the support edge 37 can fit to a small extent so that the flexural transducer unit 8 is prevented from performing an axial movement in relation to the valve housing 2 owing to the interlocking engagement between the engagement part 35 and the bearing section 12.

It will be clear that the axial location and holding in place could be effected by other means as well. In the working embodiment illustrated the axis 32 of rotation is located in a part of the bearing section 14, which in the case of electrically activated flexural transducers 12 and 13 is also piezoelectrically active, because the electrode arrangements 17a and 17b extend as far as the rotatably mounted part. As an alternative it would however be possible to provide the axis of rotation in a part of the flexural transducer unit 8 which is at all times piezoelectrically inactive irrespectively of the operational state of the flexural transducers 12 and 13. In order to stabilize the flexural transducer unit 8 in the longitudinal direction thereof in relation to the valve housing 2 so that it cannot turn in relation to in its principal plane of extent, a further centering projection 38, integral with the housing, is provided, which like a sword fits into the slot-like intermediate space between the two flexural transducers 12 and 13.

The centering projection 38 is preferably placed directly in front of the front side 34 of the bearing section 14 and extends along part of the length of the flexural transducers 12 and 13.

The engagement part 35 is located preferably on the same housing part as the controlled valve openings 24 and 25 on such housing part, the centering projection 38 being preferably provided on this housing part, which in the working example is the lower part 4.

The loading elements 36 are preferably in the form of resilient elements secured to the housing, each loading element 36 being in the present case placed as an extension of one of the two flexural transducers 12 and 13 acting on the bearing section 14. The reason for this is that the loading elements are simultaneously employed as electrical contact means 18a, by way of which the electrode arrangement 17a of each respective flexural transducer 12 and 13 receives the drive or control voltage.

Preferably the engagement part 35 also performs such a double function, because it is designed as a part of the electrical contact means 18b, by way of which the conduction of current to the electrode arrangement 17b of the second piezo body 16b takes place. For this purpose the top and bottom electrode layers of the piezo bodies 16a and 16b could be exposed so that direct electrical contact could take place by way of the electrical contact means 18a and 18b associated with the bearing section 14.

Instead of having two loading elements 36 it would be feasible in principle to also have a single loading element. Furthermore, in principle the supply of the drive voltage could take place separately means provided for providing the pivotal bearing function.

Owing to the rigid connection between the two flexural transducers 12 and 13 at the bearing section 14, it is possible for forces to be transmitted between the two flexural transducers 12 and 13 in the deflection direction 21. If one flexural transducer is acted upon in one direction of deflection, this will mean, in the absence of there being any special adaptation, an entrainment of the other flexural transducer.

In the case of the piezo valve in the working example this effect is utilized, inter alia, as a simple way of ensuring that the shut off position (FIGS. 2 through 5) is assumed when flexural transducers 12 and 13 are deactivated. Resilient means 43 are present, which are effective between the valve housing 2 and only one flexural transducer 12, such flexural transducer 12 being biased into the closed position. Owing to the relatively rigid connection at the bearing section 14 the result of this is that other flexural transducer 13 is also biased into the closed position without separate resilient means being required for separately acting on it. The closing force exerted by the resilient means on the directly associated flexural transducer 12 accordingly acts in a similar manner as well on the other flexural transducer 13.

In the working embodiment illustrate the resilient means 43 are in the form of a compression spring means, which bears between the free terminal part of the respective flexural transducer 12 and the opposite section of the valve housing 2. However, it would in principle to utilize other types of resilient means or indeed other points of engagement for the resilient to act upon.

It is convenient for the resilient means 43 to cooperate with the first flexural transducer 12 serving the supply duct 27a, since, owing to the gage pressure obtaining, it is here that the greatest opposite force is to be applied.

For the sake of completeness it is to be noted that in principle both flexural transducers 12 and 13 could also be biased into a predetermined position.

A particularly advantageous aspect of the piezo valve 1 will appear when the flexural transducers 12 and 13 are moved in opposite directions in operation. In this case the fixed connection with the above mentioned pivotal between means leads to an increase in the displacement path able to be moved through by the respective control flexural transducer, that is to say of the distance, which may be produced, between the respective control flexural transducer and the associated control valve opening in the open position.

Figure 2:
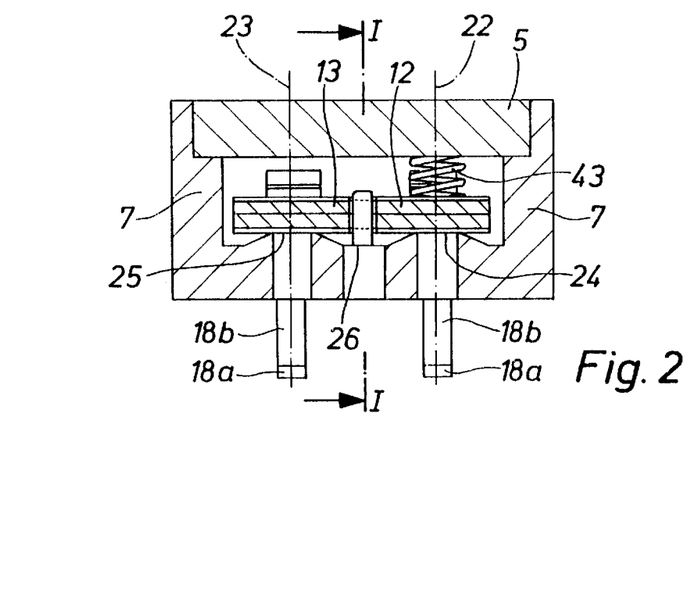
FIG. 2 shows the piezo valve of FIG. 1 in a cross sectional view taken on the section line II—II in a shut position, each flexural transducer closing a valve opening served by it.
Figure 3:
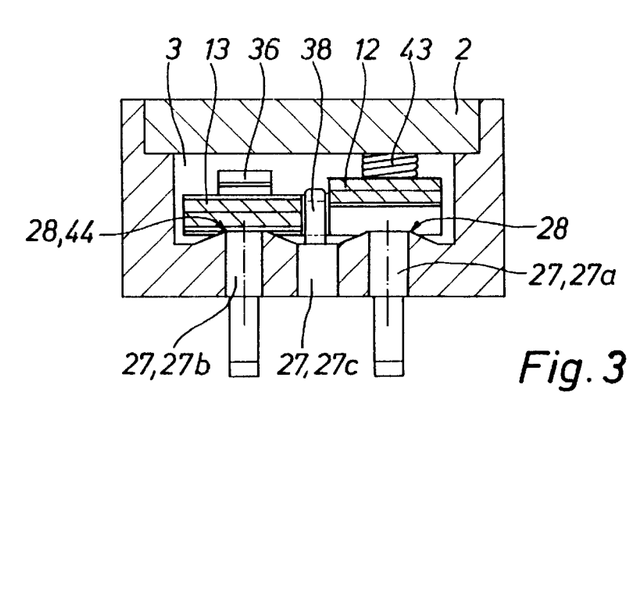
FIG. 3 is a further view of the piezo valve of FIG. 1 in a manner of representation as in FIG. 2 and in a supply setting, in which the one valve opening belonging to a supply duct is uncovered and the valve opening belonging to a venting duct is closed
Figure 4:
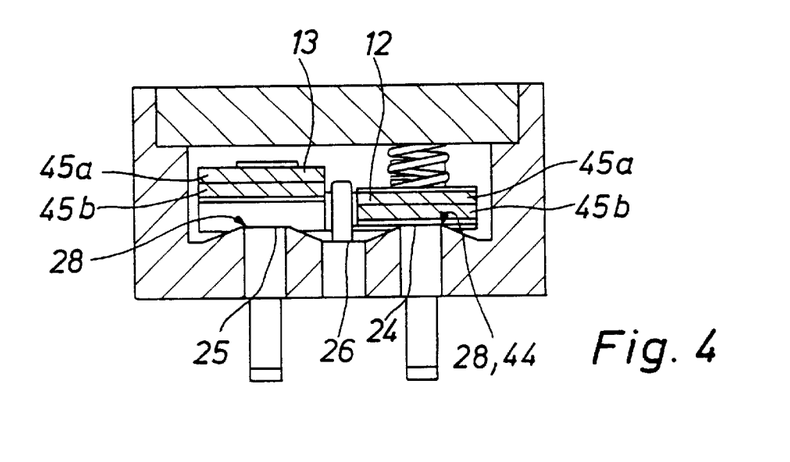
FIG. 4 shows the piezo valve of FIG. 1 in a manner of representation as in FIGS. 2 and 3 in a venting position, in which the valve opening of a venting duct is opened and the valve opening of a supply duct is closed.
Figure 5:
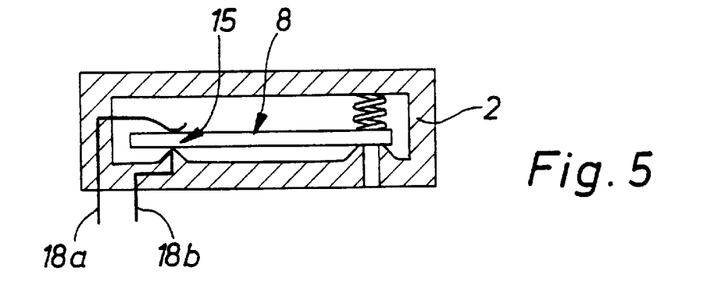
FIGS. 5 through 7 show the piezo valve of FIG. 1 in a diagrammatic longitudinal section, again showing the shut position (FIG. 5), the supply position (FIG. 6) and the venting position (FIG. 7).
Figure 6:
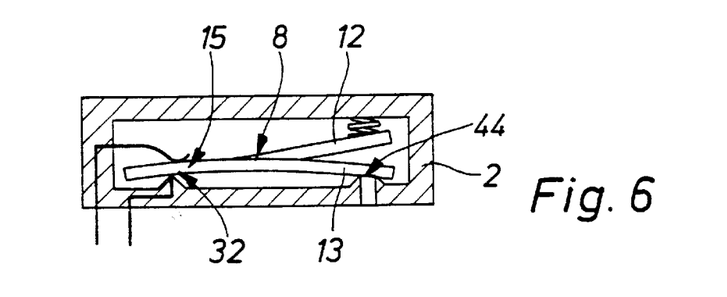
Figure 7:
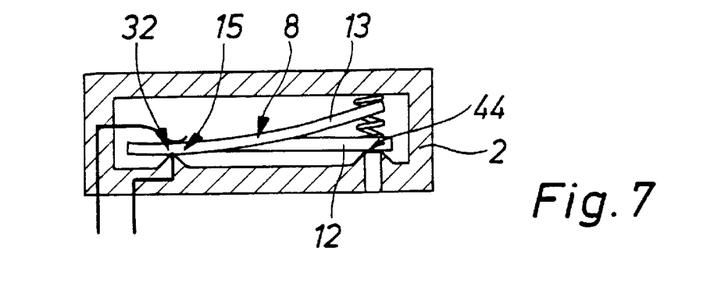

For explaining this the starting point is the shut position depicted in FIGS. 2 and 5 and the supply position of FIGS. 3 and 6. In the deactivated state we have the shut off position, in which the two flexural transducers 12 and 13 are thrust by the resilient means 43 against the valve seat 28 of the associated valve opening 24 and 25 so that the valve openings are closed and each flexural transducer goes into a closed position.

In order to get into the supply position the first flexural transducer 12 is operated so that it is lifted from the associated valve seat 28. Simultaneously the second flexural transducer 13 is so acted upon that it has a tendency to be deflected in the opposite direction. The second flexural transducer 13 is accordingly additionally thrust against the valve seat 28 associated with it, such seat then serving as a support face 44, which in fact prevents deflection of the second flexural transducer 13 at the second valve opening 25. However, the deflecting force applied means that the second flexural transducer 13 is curved or bent generally as depicted in FIG. 6 so that the bearing section 14 is pivoted about the axis 32 of rotation, something which owing to the above mentioned entraining action will mean that the first flexural transducer 12 will be moved further away from the valve seat 28 of the associated valve opening 24.

In this case the second flexural transducer 13 functions as support flexural transducer, which contributes to a further increase in the stroke of the first flexural transducer 12 functioning as the control flexural transducer.

The reverse manner of operation is available on reversing the polarity of the drive voltage so that the first flexural transducer 12 is thrust toward the closed position and the second flexural transducer 13 is cleared from the second valve opening 25 it serves. In this case the first flexural transducer 12 works as a support flexural transducer, which is biased toward the seat 28 of the associated first valve opening 24, such valve seat 28 now functioning as a support face. The result is the venting position indicated in FIGS. 4 and 7, the displacement movement of the second flexural transducer 13 again being increased by the above mentioned effect.

In a manner dependent of the selected driving action or control the two flexural transducers 12 and 13 accordingly operate alternately as support flexural transducers for the respectively other flexural transducer and lead to an increase of the displacement movement possible.

The support of a flexural transducer may furthermore if necessary also be employed to increase the closing force, with which the other flexural transducer is thrust against valve opening it serves. In this case the valve opening served and the support face associated with the support flexural transducer would preferably be arranged on opposite sides of the principal plane of extent of the flexural transducer 8. This design is not illustrated in drawings.

For example in conjunction with a piezo valve, which is only designed for a 2/2 switching function, it is possible to dispense with the mutual action of the two flexural transducers as support flexural transducers. It is then possible to have such a design that only one flexural transducer is utilized as a control flexural transducer serving for the control of one valve opening, whereas the other flexural transducer would solely be employed as a support flexural transducer, the support face being any convenient face on the housing, which is free of a valve opening. The support flexural transducer would then not possess a fluid control function of its own, and would only operate for increasing the displacement and/or force of the other flexural transducer functioning as the control flexural transducer.

It is convenient for all measures and means for providing a pivotal support of the flexural transducer unit 8 and the valve openings 24 and 25 to be served and the support faces 44 to be provided on one and the same part of the valve housing 2, same being in the present case the bottom housing part 4.

A further advantage of the piezo valve 1 is that it is possible to dispense with a rigid clamping in place of the flexural transducer unit 8, which must be specially designed as regards a biasing force. Fitting in place is therefore simple.

Figure 10:
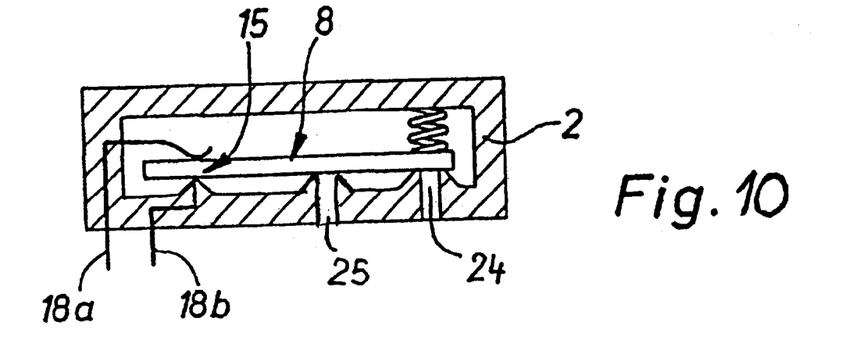
FIG. 10 illustrates an alternative embodiment of the present invention showing valves along different distances along the transducer.
Figure 11:
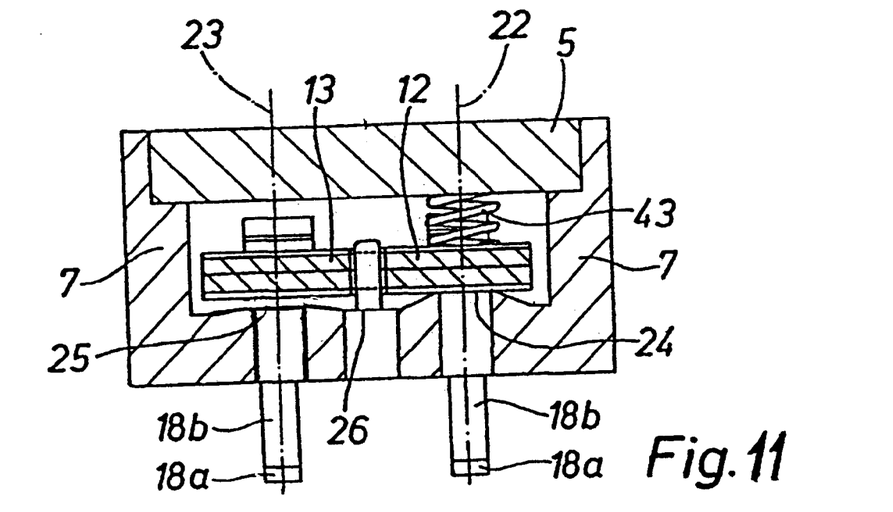
FIG. 11 illustrates a flexural transducer unit having several valve openings arranged at different levels.
Figure 12:
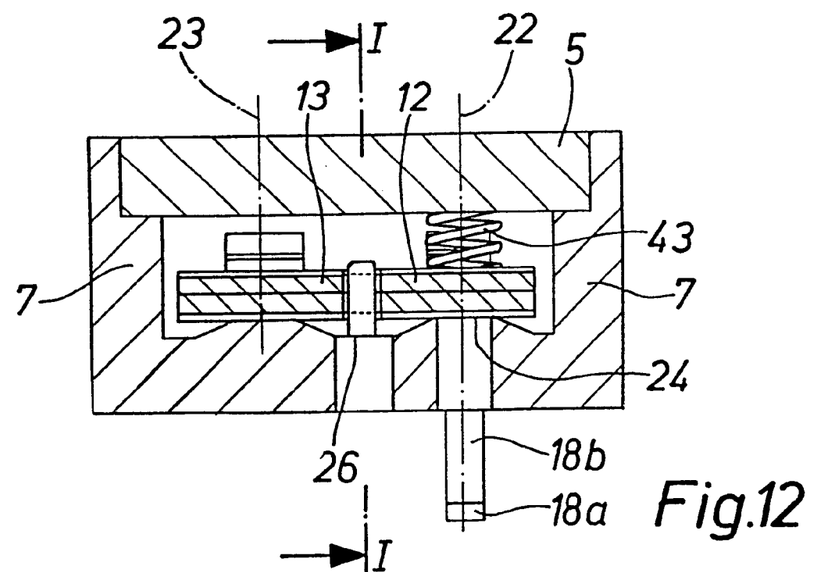
FIG. 12 illustrates the piezo valve showing a 2/2 valve functionality.

Owing to the mechanical kinematic coupling between the two flexural transducers 12 and 13, given a suitable adaptation of the housing geometry and of the association of the valve openings served it is possible to produce extremely simple piezo valves with a wide range of operational characteristics. Referring to FIG. 10 it is shown two valve openings served 24 and 25 not as in the working example, (where they are at the same distance from the pivot axis 32) but at different distances therefrom. Furthermore, the flexural transducers 12 and 13 could be of different length instead of having the same length in the working example. Finally it would also be possible for the valve seats 28 of the valve openings 24 and 25 not to be arranged in a single plane as in the working example but at different levels so that, departing from the condition illustrated in FIG. 2, the biasing action of the one flexural transducer against the valve seat served does not simultaneously hold the other flexural transducer in a closed position, and in fact the valve opening associated with it would remain open. As shown in FIG. 11, the valve openings are shown to be at different planes or different levels. The piezo valve can also be designed so that at least one flexural element provided with two served valve openings placed on opposite longitudinal sides.

The torsionally stiff connection between the two flexural transducers 12 and 13 at the bearing point 15 can furthermore be produced by any suitable means, as for example by fixing the two flexural transducers 12 and 13 in relation to each other by mechanical connecting means and/or relatively bracing them in relation to each other or by bonding or welding the flexural transducers together. It is however more particularly advantageous to adhere to the embodiment, in the case of which the piezo bodies lying in a common plane of the transducers 12 and 13 are integrally joined together in their layers 45a and 45b of piezo material. The piezo layers lying in the same plane are thus in the form of a single body which may be produced for example by the production of a longitudinal slot defining the intermediate space 42, in a plate of piezo material.

Owing to the integral design it is possible to produce a an identical structure of the two flexural transducers 12 and 13 in a particularly simple manner, something which ensures identical operating characteristics.

What is claimed is:

1. A piezo valve comprising, a flexural transducer unit arranged in a valve housing and having at least two flexural transducers able to be driven by the application of drive voltages to produce opposite deflection movements, said two flexural transducers being arranged alongside each other with mutually parallel planes of deflection, and being fixedly joined together in a terminal region of the flexural transducer unit with the formation of a common bearing section, at which the flexural transducer unit is pivotally mounted for pivoting in relation to the valve housing around a axis of rotation extending athwart the deflection planes, at least one of said flexural transducers being a control flexural transducer serving for the control of at least one associated valve opening, while the other flexural transducer is constituting a support flexural transducer which is suitable for increasing the displacement and the force of the control flexural transducer and which may be biased against a support face arranged in its displacement path by the application of the drive voltage.

2. The piezo valve as set forth in claim 1 wherein each flexural transducer is designed in the form of a control flexural transducer for serving at least one valve opening, a support face being defined in the displacement path of each flexural transducer, such support face rendering possible use of the respective control flexural transducer as a support flexural transducer for the other flexural transducer.

3. The piezo valve as set forth in claim 1 wherein the valve opening served is placed in the deflection path of the associated flexural transducer.

4. The piezo valve as set forth in claim 3 wherein the support face is constituted by a valve seat surrounding the valve opening served by the associated control flexural transducer.

5. The piezo valve as set forth in claim 3 wherein the valve opening served by control flexural transducer is located on the same longitudinal side of the flexural transducer unit as the support side associated with the adjacent support flexural transducer.

6. The piezo valve as set forth in claim 5 comprising a flexural transducer unit having two control flexural transducers, all valve openings served and all support side faces being arranged on the same longitudinal side of the flexural transducer unit.

7. The piezo valve as set forth in claim 1, wherein means for pivotally bearing the flexural transducer unit and the valve openings served and the support sides are provided on one and the same part of the valve housing.

8. The piezo valve as set forth in claim 1, comprising resilient means adapted to so act on the flexural transducer unit that at least one control flexural transducer is biased in the closing direction for the valve opening served.

9. The piezo valve as set forth in claim 8, wherein such resilient means hold the associated control flexural transducer in the closed position in the absence of a drive voltage.

10. The piezo valve as set forth in claim 1, wherein such flexural elements are so electrically linked that common driving is possible producing a simultaneous opposite deflection.

11. The piezo valve as set forth in claim 1, comprising at least one further valve opening, which is continuously open, and which may be connected for fluid flow with at least one of the served valve openings dependent on the position of switching of the flexural transducers.

12. The piezo valve as set forth in claim 1, wherein said valve functionality is selected from a group consisting of a 2/2, 3/2, 3/3, or 3/4 functionality.

13. The piezo valve as set forth in claim 1, wherein the flexural transducer unit for providing a pivotal support thereof has one side of its bearing section on an engagement part on the housing, said flexural transducer unit being biased by at least one loading element, acting on the other side, toward the engagement part.

14. The piezo valve as set forth in claim 13, wherein the at least one loading element is a resilient element fixed to the housing.

15. The piezo valve as set forth in claim 13, where by way of at least one loading element and thee engagement part electrical contact may be produced with the flexural elements for the supply of the drive voltage.

16. The piezo valve as set forth in claim 1, wherein the flexural transducer unit is immovably fixed at the pivot bearing point to prevent movement in the longitudinal direction of the flexural transducer unit.

17. The piezo valve as set forth in claim 1, wherein the axis of rotation is in the direct vicinity of a front side of a bearing section.

18. The piezo valve as set forth in claim 1, wherein the axis of rotation is located in apart of a bearing section which when the flexural transducers are electrically activated piezoelectrically active.

19. The piezo valve as set forth in claim 1, having several valve openings to be served, valve seats associated with them being arranged at different distances from the axis of rotation.

20. The piezo valve as set forth in claim 1, wherein in the case of there being several valve openings to be served the valve seats corresponding thereto are arranged in a common plane.

21. The piezo valve as set forth in claim 1, wherein the flexural transducers have an identical structure.

22. The piezo valve as set forth in claim 1, wherein the two flexural transducers respectively possess at least one piezo body having at least one piezo material layers and an associated electrode arrangement, and they are connected together at the bearing section with the piezo material layers of their piezo bodies integrally.

23. The piezo valve as set forth in claim 1, wherein the axis of rotation is located in a part of a bearing section which when the flexural transducers are electrically activated it is piezoelectrically inactive.

24. The piezo valve as set forth in claim 1, wherein in the case of there being several valve openings to be served the valve seats corresponding thereto are arranged at a different level as related to the deflection direction.

* * * * *